(12) United States Patent
Pratt et al.

(10) Patent No.: US 10,026,106 B2
(45) Date of Patent: Jul. 17, 2018

(54) SYNTHETIC PRICING FOR DEVICES IN AN ENERGY MANAGEMENT SYSTEM

(71) Applicant: Intel Corporation, Santa Clara, CA (US)

(72) Inventors: Annabelle Pratt, Hillsboro, OR (US); Tomm Aldridge, Olympia, WA (US)

(73) Assignee: Intel Corporation, Santa Clara, CA (US)

( * ) Notice: Subject to any disclaimer, the term of this patent is extended or adjusted under 35 U.S.C. 154(b) by 752 days.

(21) Appl. No.: 14/079,274

(22) Filed: Nov. 13, 2013

(65) Prior Publication Data
US 2015/0134570 A1 May 14, 2015

(51) Int. Cl.
 *G06Q 40/00* (2012.01)
 *G06Q 30/02* (2012.01)
 *G06Q 50/06* (2012.01)

(52) U.S. Cl.
 CPC .......... *G06Q 30/0283* (2013.01); *G06Q 50/06* (2013.01)

(58) Field of Classification Search
 CPC .... G06Q 50/06; G06Q 30/0283; G06Q 10/00; G06Q 10/04; G06Q 10/06312; G06Q 30/0206; Y04S 10/54; Y04S 20/222; Y04S 20/224; B60L 11/184
 See application file for complete search history.

(56) References Cited

U.S. PATENT DOCUMENTS

| | | | | |
|---|---|---|---|---|
| 2009/0292402 | A1* | 11/2009 | Cruickshank, III ... | G06Q 10/00 700/287 |
| 2013/0085614 | A1* | 4/2013 | Wenzel ................. | F24F 11/006 700/277 |
| 2014/0343983 | A1* | 11/2014 | Narayan ................ | G06Q 10/04 705/7.12 |

FOREIGN PATENT DOCUMENTS

WO  WO 2014186846 A1 * 11/2014 ................ H02J 3/14

OTHER PUBLICATIONS

Mo et al., Cyber-Physical Security of a Smart Grid Infrastructure, Proceedings of the IEEE, vol. 100, No. 1, Jan. 2012, http://ieeexplore.ieee.org/stamp/stamp.jsp?arnumber=6016202&tag=1, retrieved Apr. 29, 2016.*

* cited by examiner

*Primary Examiner* — George Chen
(74) *Attorney, Agent, or Firm* — International IP Law Group, P.L.L.C.

(57) ABSTRACT

Techniques for providing a synthetic price are described herein. The techniques may include a method of synthetic price provisioning including identifying a device operating in a consumption entity, wherein the device operates at least partially based on a pricing signal provided by an energy provider. Optimal operation is determined based on the device and other devices in the consumption entity. The method includes providing a synthetic pricing signal to replace the pricing signal provided by the energy provider such that the devices operate according to the optimization model.

18 Claims, 5 Drawing Sheets

SYNTHETIC PRICING FOR DEVICES IN AN ENERGY MANAGEMENT SYSTEM

TECHNICAL FIELD

This disclosure relates generally to techniques for providing synthetic pricing. More specifically, the disclosure describes techniques for synthetic price provision to a device within a consumption entity.

BACKGROUND

Energy management systems include devices having programming to control operation of the devices. Some energy management systems may be utilized to control the devices within the system based on different optimization techniques. Some of the devices may be manufactured by different manufactures and may not enable a centralized energy management system to customize operation of the devices within the energy management system. For example, some devices may include application programming interfaces (APIs) that are not publically available for integration of a given device with the energy management system.

The same numbers are used throughout the disclosure and the figures to reference like components and features. Numbers in the 100 series refer to features originally found in FIG. 1; numbers in the 200 series refer to features originally found in FIG. 2; and so on.

DETAILED DESCRIPTION

Energy management systems, as referred to herein, are systems of computer-aided tools used by consumers of utilities to monitor, control, and optimize the performance, such as consumption of devices within a system. Energy management systems may include a home energy management system (HEMS), building energy management system (BEMS), and the like. A HEMS may manage multiple devices configured to operate based on pricing data of a given utility associated with the operation of a given device. The HEMS may be utilized to optimize management of smart devices. In some cases, smart devices are devices having programming and or logic that configures the device to modify the operation of the device based on a varying price provided by the energy provider, such as an electricity provider, a gas provider, and the like. However, a given HEMS may be required to manage multiple devices made by different manufactures that do not cooperate with the HEMS to optimize operation such that overall consumption of various utilities in terms of price is reduced. As stated above, a given device may include an API that is not publically available and, therefore, the HEMS may not be able to coordinate operation of devices in order to optimize consumption of energy in view of varying prices for a given energy source. However, in some scenarios, a given device may receive pricing signals from the energy provider via a connection to the internet. Rather than requiring access and knowledge of the API for such a device, a HEMS may provide synthetic pricing signals to the device based on a customized optimization model for a given consumption entity.

A consumption entity, as referred to herein, is an entity having one or more devices consuming a given energy source. For example, a consumption entity may include a residential home. In some embodiments, a consumption entity includes multiple homes. In some embodiments, a consumption entity may include a business residence, a place of business, a group of business residences and/or places of business, and any combination thereof. A given consumption entity may benefit by receiving a synthetic pricing signal according to a given optimization module for the consumption entity as explained in more detail below.

The subject matter disclosed herein relates to techniques for providing a synthetic pricing signal. In some cases, a synthetic pricing signal is an artificial pricing signal customized for a given energy management system. In an energy management system, individual devices may include a specific application programming interface (API) configured to modify the operation of the device based on changing conditions. The changing conditions can include a pricing signal provided by an energy provider. For example, a dishwasher may be configured with an API directing the dishwasher to run only when a price to run the dishwasher, as indicated by the pricing signal provided by the energy provider, is lower compared to other prices to reduce the cost of running the dishwasher to a user. However, if the dishwasher and another device having an API configured to operate at the same lower price are run at the same time, the combined consumption of both devices may result in a price peak. Further, if the devices do not communicate with each other, the price peak may be unavoidable.

Figure 1:
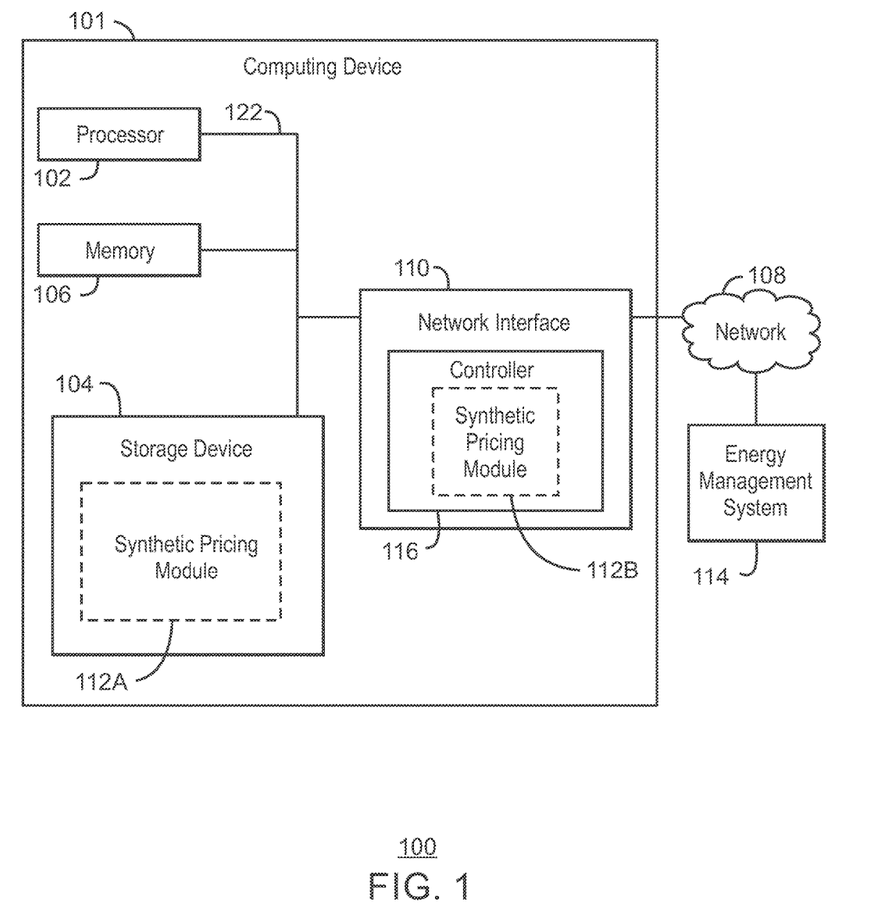
FIG. 1 is a block diagram of a computing system configured to provide synthetic pricing signals.

FIG. 1 is a block diagram of a computing system configured to provide synthetic pricing signals. The computing system 100 may include a computing device 101 having a processor 102, a storage device 104 comprising a non-transitory computer-readable medium, and a memory device 106. The computing device 101 may be a networked computing device, such as a server, connected to a network 108 via a network interface 110.

The storage device 104 may include a polling module 112A. The polling module 112A may be a set of instructions stored on the storage device 104. The instructions, when executed by the processor 102, direct the computing device 101 to perform operations including identifying devices (not shown) operating in an environment where they are managed by an energy management system 114, wherein the devices operate at least partially based on a pricing signal provided by an energy provider. As illustrated in FIG. 1, an energy management system may be communicatively coupled to the computing device 101 via the network 108. The instructions may direct the computing device 101 to determine an optimization model based on the devices managed by the energy management system 114. The instructions may direct the computing device 101 to provide a synthetic pricing signal to replace the pricing signal provided by the energy provider such that the devices operate according to the optimization model.

In embodiments, the synthetic pricing module 112A may be implemented as logic, at least partially including hardware logic, and indicated by the dashed box 112B as opposed to instructions carried out by the processor 102 as indicated by the dashed box 112A. In embodiments, the synthetic pricing module, either 112A or 112B, may be implemented as a combination of hardware, software, or firmware. As illustrated in FIG. 1, the synthetic pricing module 110B may be implemented within a network interface 110 including a controller 116, such as a USB controller configured to implement the synthetic pricing module 112B as logic, at least partially including hardware logic, as software, firmware, or any combination thereof.

The processor 102 may be a main processor that is adapted to execute the stored instructions. The processor 102 may be a single core processor, a multi-core processor, a computing cluster, or any number of other configurations. The processor 102 may be implemented as Complex Instruction Set Computer (CISC) or Reduced Instruction Set Computer (RISC) processors, x86 Instruction set compatible processors, multi-core, or any other microprocessor or central processing unit (CPU).

The memory device 106 can include random access memory (RAM) (e.g., static random access memory (SRAM), dynamic random access memory (DRAM), zero capacitor RAM, Silicon-Oxide-Nitride-Oxide-Silicon SONOS, embedded DRAM, extended data out RAM, double data rate (DDR) RAM, resistive random access memory (RRAM), parameter random access memory (PRAM), etc.), read only memory (ROM) (e.g., Mask ROM, programmable read only memory (PROM), erasable programmable read only memory (EPROM), electrically erasable programmable read only memory (EEPROM), etc.), flash memory, or any other suitable memory systems. The main processor 102 may be connected through a system bus 122 (e.g., Peripheral Component Interconnect (PCI), Industry Standard Architecture (ISA), PCI-Express, HyperTransport®, NuBus, etc.) to components including the memory 106, the storage device 104, and the network interface 110.

The block diagram of FIG. 1 is not intended to indicate that the computing device 101 is to include all of the components shown in FIG. 1. Further, the computing device 101 may include any number of additional components not shown in FIG. 1, depending on the details of the specific implementation.

Figure 2:
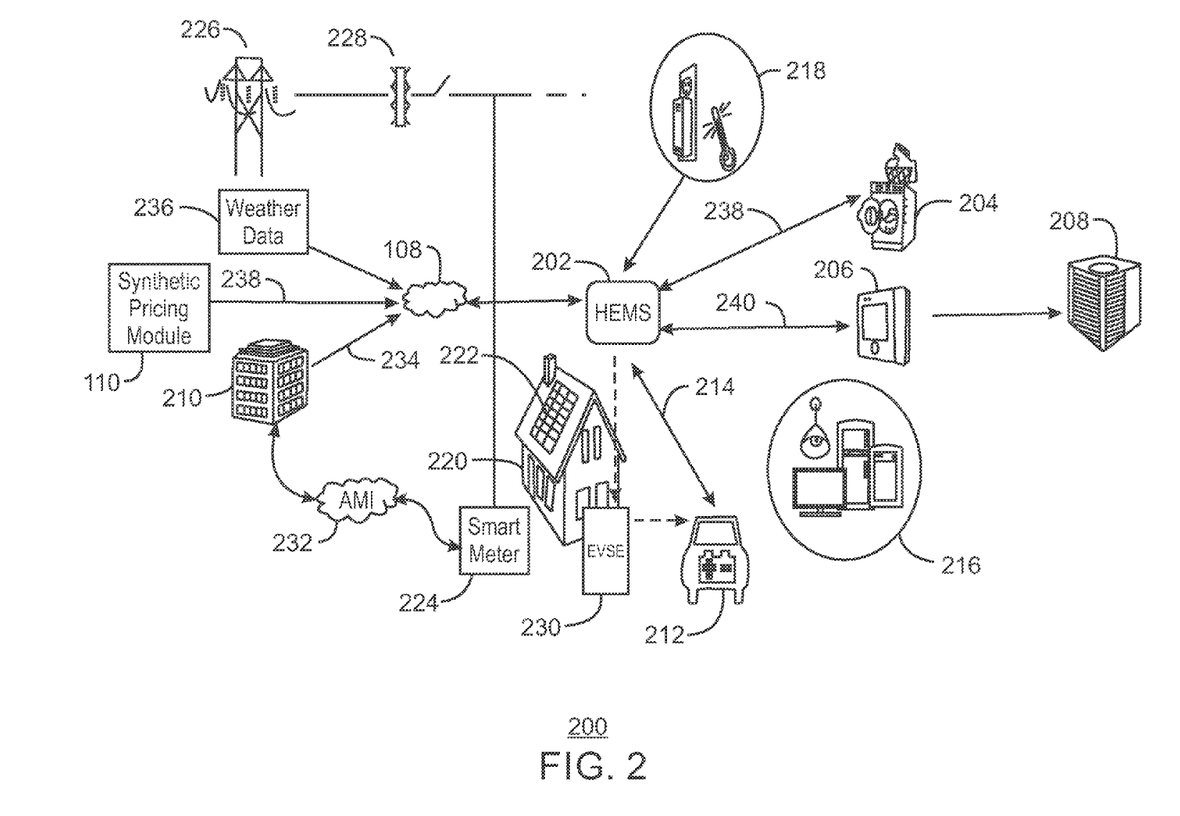
FIG. 2 is a diagram illustrating a synthetic pricing mechanism within an energy consumption environment.

FIG. 2 is a diagram illustrating a synthetic pricing mechanism within an energy consumption environment. As discussed above, an energy management system may be implemented at a residence in a home energy management system (HEMS) 202 configured to monitor energy consumption and operation of smart devices such as a smart dishwasher 204, a programmable communicating thermostat 206 connected to a heating ventilation and air conditioning system (HVAC) 208. The programmable communicating thermostat 206 and the smart dishwasher 204 may be configured to request and/or receive pricing signals from a utility control center 210 via a network, such as the network 108 discussed above in reference to FIG. 1. The HEMS 202 may monitor devices such as an electric vehicle 212 having a charging profile as indicated by the arrow 214, and other devices 216 that are not configured with programming to receive price signals. In embodiments, the devices 216 may be viewed as an uncontrollable load. In some cases, uncontrollable load may be load associated with devices that are not smart devices, or that are not amenable to load scheduling. However, a load profile of the devices 216 may be monitored by the HEMS 202. A load profile may be a model based on historical use, heuristic analysis, or any applicable analysis that may model the load of devices 216. In some embodiments, the devices may include sensors 218 such as power sensors, ambient sensors, and any other sensor that can provide feedback to the HEMS 202.

In embodiments, the HEMS 202 may be present in a residence 220 having photovoltaic panels 222. Power provided by the photovoltaic panels 222 may be delivered to the residence through the smart meter 224 configured to monitor power delivered to the residence 220, or it may provide power back to a grid 226 via a distribution transformer 228. Power provided by the photovoltaic panels may also be delivered directly to the residence 220, or to the grid 226 through the smart meter 224. The smart meter 224 may be communicatively coupled to an advanced metering infrastructure (AMI) 232 and may be configured to communicate via a separate communication channel with the utility control center 210 rather than via the network 108. In some embodiments, a pricing signal may be provided through the AMI 232 network and the HEMS 202 may retrieve the price from the smart meter 224. Further, in some embodiments, the electric vehicle 212 may be associated with electric vehicle supply equipment (EVSE) 230, wherein the HEMS 202 may monitor and control the operation and load requirements of the electric vehicle 212, the EVSE 230, or any combination thereof.

As discussed above, the HEMS 202 may monitor devices within the residence 220. Smart devices, such as the smart dishwasher 204 and the programmable communicating thermostat 206, may be configured with logic to receive pricing signals from the utility center 210 as indicated by the arrow 234. In some embodiments, the HEMS 202 may receive the pricing signal 234 from the utility control center 210, as well as other data such as current and forecasted weather data 236, from which the HEMS 202 may determine the optimal operation of devices based on changes in pricing of a utility throughout different time periods, or instantaneously, in addition to preferences of the occupants such as desired air temperature, desired completion time of EV charging or smart dishwasher operation. The optimization performed by the HEMS 202 may also take into account the occupancy state, or even which specific occupants are home at a given time. The HEMS may output temperature set-points for the thermostat, the time to start a specific appliance, or the rate at which the battery in the EV should be charged at a specific time. However, in some embodiments, a given smart device may be configured to directly fetch pricing data and perform optimization for the given device. Further, some manufactures of a smart device, such as the smart dishwasher 204, may not release an application programming interface (API) for a given device. In other embodiments, even if the API of a given device is released and usable, coordination between smart devices may not be feasible due to communication issues between each device and the HEMS 202.

For example, the smart dishwasher 204 may be configured to receive a pricing signal from the utility control center 210 via the network 108. In response to receiving the pricing signal, the smart dishwasher 204 may operate only when the pricing signal is low. However, if the programmable communicating thermostat 206 determines to operate at the same time as the smart dishwasher 204, overall load may increase and, in cases where a penalty is imposed for peak consumption of the energy provided by the utility, cost reduction for energy used may not be realized.

The techniques described herein include a synthetic pricing module, such as the synthetic pricing module 110 described in reference to FIG. 1. When a pricing signal is requested by one of the smart devices, such as the smart dishwasher discussed in the example above, the HEMS 202 may intercept the request and provide the 204 with a synthetic pricing signal indicated by the arrows 238. In this manner, the smart dishwasher 204 may be controlled via the synthetic pricing signal 238, even if an API associated with the smart dishwasher 204 is unavailable, or if communication between the HEMS 202, the smart dishwasher 204, and other devices within the residence 220 is unavailable.

The synthetic pricing signal may be based on an determination of optimal operation of a plurality of devices managed by the HEMS 202. In some embodiments, the optimal operation of a plurality devices is based, in part, on a model of how a specific device would respond to a price signal. For example, a model for the smart dishwasher 204 may indicate that the dishwasher will always operate during the lowest cost time period. Therefore, the HEMS 202 would issue a synthetic price profile to the smart dishwasher 204 that has the lowest price at the time that the HEMS 202 determined would be the optimal time for the dishwasher to operate. The optimization model may determine optimal operation of devices within the residence so as to avoid peaks in energy consumption. In other words, the optimization model may be configured such that the overall energy consumption of the residence 220 is load-leveled. Load-leveling, as referred to herein, is a technique of controlling consumption of devices within the residence such that relatively high peaks are not realized within the HEMS 202.

In some embodiments, the synthetic pricing module 110 may be configurable via a webpage of a website. The configuration may be performed by a resident of the residence 224, a home energy management expert, or other user to customize consumption via the synthetic pricing signaling described herein. In some embodiments, the HEMS 202 may determine optimal operational parameters, such as temperature setpoints or charging profiles, for the devices within the residence 220, and may provide these to the synthetic pricing module 110 from which synthetic pricing signals may be determined based on models of how specific devices respond to price signals. In other embodiments, the synthetic pricing module 110 may be logic, at least partially comprising hardware logic, at the HEMS 202 rather than being remotely located via the network 108. Whether, the synthetic pricing module 110 resides in the HEMS 202 or whether the synthetic pricing module 110 resides as logic in the HEMS 202, may be determined by a manufacturer of the techniques described herein.

Figure 3:
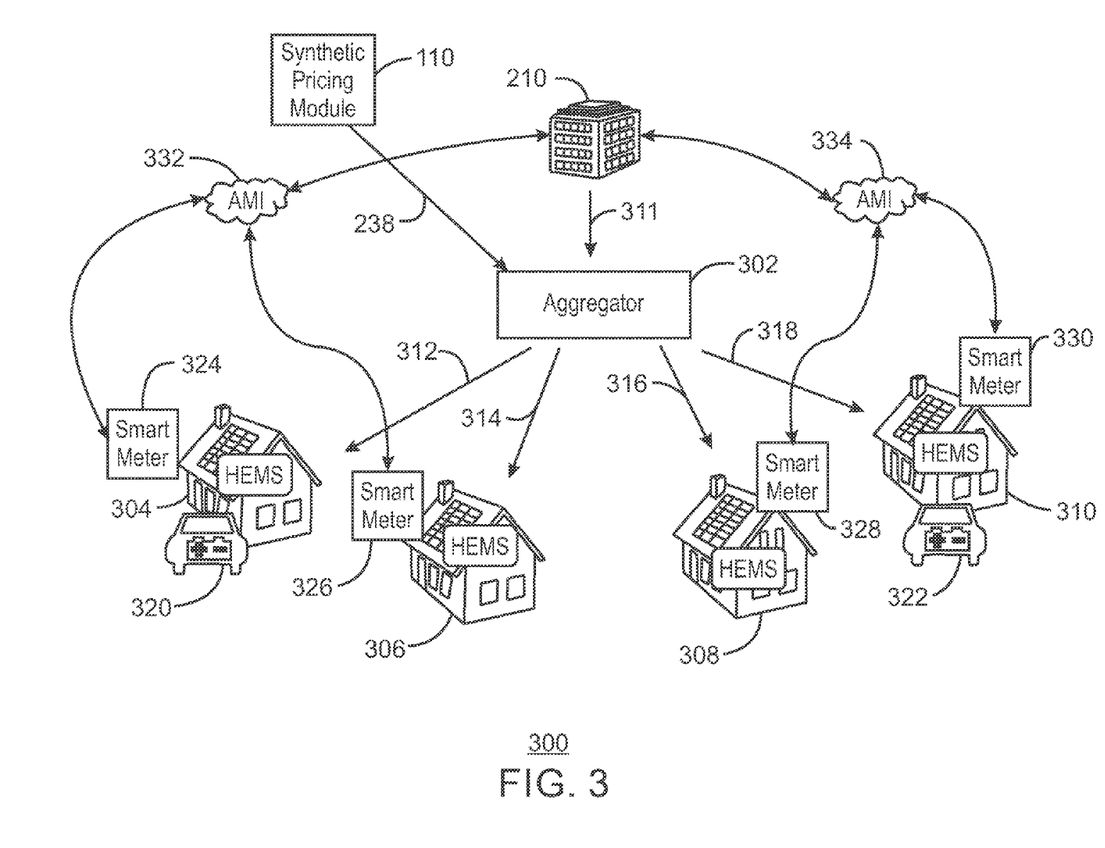
FIG. 3 is a diagram illustrating a synthetic pricing mechanism within an energy consumption environment utilizing an aggregator.

FIG. 3 is a diagram illustrating a synthetic pricing mechanism within an energy consumption environment utilizing an aggregator. The aggregator 302 may be communicatively coupled with residences 304, 306, 308, 310. An aggregator, as referred to herein, is an entity designed to monitor and optimize energy consumption for a group of consumption entities, such as the residences 304, 306, 308, 310 based on a pricing signal 311 provided from a utility control center and a synthetic price provided from a synthetic pricing module. As discussed in reference to FIG. 2, a synthetic pricing signal 238 may be provided from a synthetic pricing module 110. The synthetic pricing module 110 may be remote from the aggregator 302, or may be integrated as logic, at least partially including hardware logic, of the aggregator 302. The synthetic pricing signals 312, 314, 316, 318 may be provided to the residences 304, 306, 308, 310, respectively.

In some embodiments, the synthetic pricing signals 312, 314, 316, 318 may be provided to the residences 304, 306, 308, 310 selectively. For example, the residence 304 may be provided the synthetic pricing signal 312 at a given time, while the residence 306 may be provided the pricing signal from the utility control center 210, as indicated by the arrow 311. The selectivity of providing synthetic price signals, utility control center 210 prices 311, or any combination thereof may be determined by the aggregator 302 based on a given optimization approach used by the aggregator 210.

In some embodiments, the synthetic price signals 312, 314, 316, 318 are provided based on devices at a given residence. For example, an electric vehicle, such as the electric vehicles 320, 322 may be a part of the residences 304, 310, respectively. Further, in some scenarios, power generated via photovoltaic panels may be desired to be utilized during different times such that optimal amounts of power are returned via smart meters 304, 306, 308, 310, with measurements reported via the AMI network 332 and 334, respectively. As discussed above in reference to FIG. 2, power provided by photovoltaic panels may be delivered to the residence through a smart meter 324, 326, 328, or 330 configured to monitor power delivered to the residence, or it may provide power back to a grid. Power provided by the photovoltaic panels may also be delivered directly to the residences 304, 306, 308, 310, or to the grid through the smart meters 304, 306, 308, 310.

Figure 4:
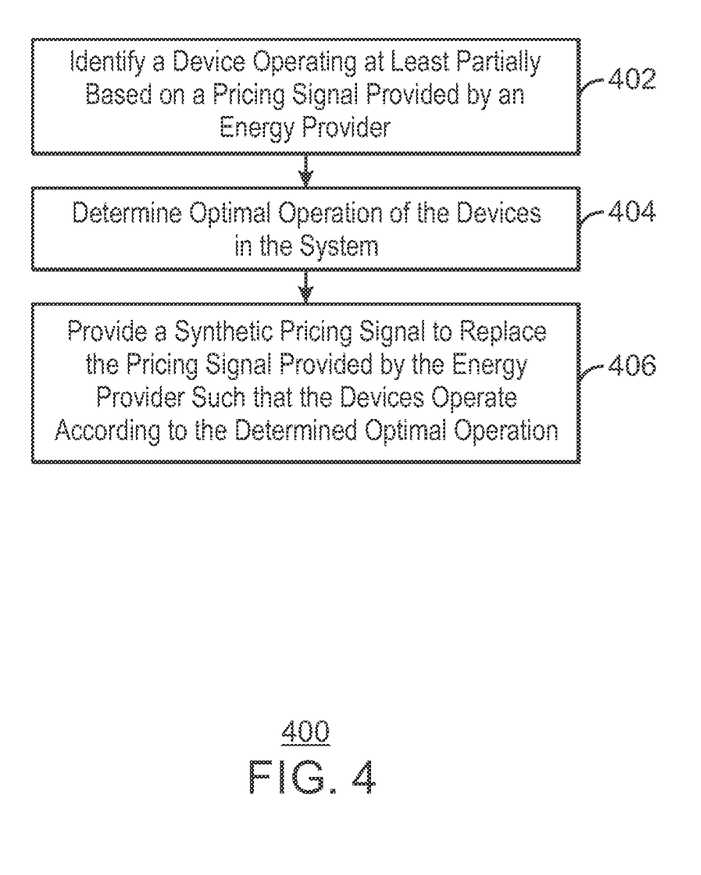
FIG. 4 is a block diagram illustrating a method of provisioning a synthetic pricing signal.

FIG. 4 is a block diagram illustrating a method of provisioning a synthetic pricing signal. The method 400 may include identifying, at block 402, a device operating in a consumption entity, wherein the device operates at least partially based on a pricing signal provided by an energy provider. A device may be identified by a HEMS, such as the HEMS 202 of FIG. 2. In some embodiments, devices may be manually identified by an administrator of a HEMS, a user of a HEMS, and the like, and entered into internal logic of the HEMS or into a remote website communicatively coupled to the HEMS. At block 404, the optimal operation of devices is determined based on the device and other devices in the consumption entity. A synthetic pricing signal is provided, at block 406, to replace the pricing signal provided by the energy provider such that the devices operate according to the determined optimal operation.

In embodiments, the identified device comprises an application programming interface (API) to control operation of the identified device, further comprising overriding the API control via the synthetic pricing signal to control operation of the identified device. In other words, the operation of the identified device may be modified by the synthetic pricing signal even when access to a given devices API is not available.

In embodiments, providing a synthetic pricing signal includes receiving a request from the identified device for the pricing signal from the energy provider. For example, a smart device may request a pricing signal via internet protocol request, and the request may be intercepted. Rather that providing the pricing signal from the energy providing, the synthetic pricing signal may be provided in response to the request.

In some embodiments, the optimization approach may include a set of rules for optimization. The rule-set may be programmed into logic of an optimization module. In some embodiments, the optimization module is accessible via a remote website to provide configurable optimization of the energy management system.

The consumption entity includes a residence, a group of residences, a business residence, a group of business residences; or any combination of the above. In some embodiments, the consumption entity may be a group of residences and the synthetic pricing signal may be provided by an aggregator as discussed in more detail above in reference to FIG. 3.

Figure 5:
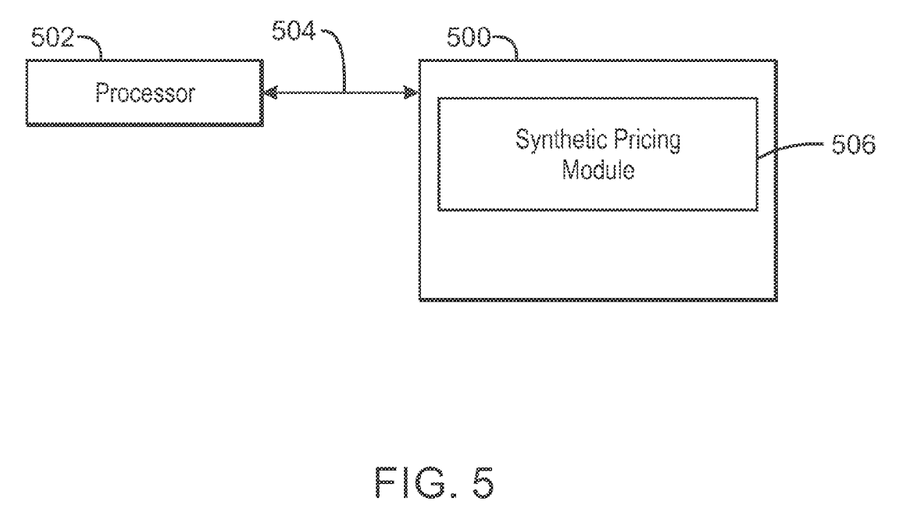
FIG. 5 is a block diagram depicting an example of a tangible, non-transitory computer-readable medium configured to provide a synthetic pricing signal.

FIG. 5 is a block diagram depicting an example of a tangible, non-transitory computer-readable medium configured to provide a synthetic pricing signal. The tangible, non-transitory, computer-readable medium 500 may be accessed by a processor 502 over a computer bus 504. Furthermore, the tangible, non-transitory, computer-readable medium 500 may include computer-executable instructions to direct the processor 502 to perform the steps of the current method.

The various software components discussed herein may be stored on the tangible, non-transitory, computer-readable medium 500, as indicated in FIG. 5. For example, a synthetic pricing module 506 may be configured to identify devices operating in an energy management system, wherein the devices operate at least partially based on a pricing signal provided by an energy provider. An optimization model may be determined based on the devices within the system. A synthetic pricing signal may be provided to replace the pricing signal provided by the energy provider such that the devices operate according to the optimization model.

Example 1

A means for synthetic price provision is described herein, the means comprising logic, at least partially implemented in hardware, to identify devices operating in a means for energy management, wherein the devices operate at least partially based on a pricing signal provided by an energy provider. The means is configured to determine optimal operation of the devices in the means for energy management; and provide, via a synthetic pricing means, a synthetic pricing signal to replace the pricing signal provided by the energy provider such that the devices operate according to the determined optimal operation.

In embodiments, the providing of a synthetic pricing signal includes receiving a request from the devices for the pricing signal from the energy provider, and intercepting the request. in response to the request, the synthetic pricing signal is provided from the synthetic pricing means, rather than the pricing signal from the energy provider.

Example 2

An apparatus for synthetic price provision is described herein. The apparatus includes logic, at least partially implemented in hardware. The logic is configured identify devices operating in an energy management system, wherein the devices operate at least partially based on a pricing signal provided by an energy provider. The logic is configured to determine optimal operation of the devices in the system, and provide a synthetic pricing signal to replace the pricing signal provided by the energy provider such that the devices operate according to the determined optimal operation.

Example 3

A method for synthetic price provision is described herein. The method includes identifying a device operating in a consumption entity, wherein the device operates at least partially based on a pricing signal provided by an energy provider. An optimal operation of the devices in the system is determined, and a synthetic pricing signal to replace the pricing signal provided by the energy provider is provided such that the devices operate according to the determined optimal operation.

Example 4

A system for synthetic price provision is described herein. The system includes a plurality of devices of a consumption entity, and logic, at least partially comprising hardware logic. The logic may identify the devices, wherein one of the devices operates at least partially based on a pricing signal provided by an energy provider. The logic may determine optimal operation of the devices in the system, and provide a synthetic pricing signal to replace the pricing signal provided by the energy provider such that the identified device operates according to the determined optimal operation.

Some embodiments may be implemented in one or a combination of hardware, firmware, and software. Some embodiments may also be implemented as instructions stored on the tangible non-transitory machine-readable medium, which may be read and executed by a computing platform to perform the operations described. In addition, a machine-readable medium may include any mechanism for storing or transmitting information in a form readable by a machine, e.g., a computer. For example, a machine-readable medium may include read only memory (ROM); random access memory (RAM); magnetic disk storage media; optical storage media; flash memory devices; or electrical, optical, acoustical or other form of propagated signals, e.g., carrier waves, infrared signals, digital signals, or the interfaces that transmit and/or receive signals, among others.

An embodiment is an implementation or example. Reference in the specification to "an embodiment," "one embodiment," "some embodiments," "various embodiments," or "other embodiments" means that a particular feature, structure, or characteristic described in connection with the embodiments is included in at least some embodiments, but not necessarily all embodiments, of the present techniques. The various appearances of "an embodiment," "one embodiment," or "some embodiments" are not necessarily all referring to the same embodiments.

Not all components, features, structures, characteristics, etc. described and illustrated herein need be included in a particular embodiment or embodiments. If the specification states a component, feature, structure, or characteristic "may", "might", "can" or "could" be included, for example, that particular component, feature, structure, or characteristic is not required to be included. If the specification or claim refers to "a" or "an" element, that does not mean there is only one of the element. If the specification or claims refer to "an additional" element, that does not preclude there being more than one of the additional element.

It is to be noted that, although some embodiments have been described in reference to particular implementations, other implementations are possible according to some embodiments. Additionally, the arrangement and/or order of circuit elements or other features illustrated in the drawings and/or described herein need not be arranged in the particular way illustrated and described. Many other arrangements are possible according to some embodiments.

In each system shown in a figure, the elements in some cases may each have a same reference number or a different reference number to suggest that the elements represented could be different and/or similar. However, an element may be flexible enough to have different implementations and work with some or all of the systems shown or described herein. The various elements shown in the figures may be the same or different. Which one is referred to as a first element and which is called a second element is arbitrary.

It is to be understood that specifics in the aforementioned examples may be used anywhere in one or more embodiments. For instance, all optional features of the computing device described above may also be implemented with respect to either of the methods or the computer-readable medium described herein. Furthermore, although flow diagrams and/or state diagrams may have been used herein to describe embodiments, the techniques are not limited to those diagrams or to corresponding descriptions herein. For example, flow need not move through each illustrated box or state or in exactly the same order as illustrated and described herein.

The present techniques are not restricted to the particular details listed herein. Indeed, those skilled in the art having the benefit of this disclosure will appreciate that many other variations from the foregoing description and drawings may be made within the scope of the present techniques. Accordingly, it is the following claims including any amendments thereto that define the scope of the present techniques.

What is claimed is:

1. An apparatus for synthetic price provision, the apparatus comprising logic, at least partially implemented in hardware, to:
   identify, by an energy management controller, devices operating in an energy management system, wherein the devices are configured to operate at least partially based on a pricing signal that indicates a price of energy provided by an energy provider;
   receive, at the energy management controller, the pricing signal from the energy provider;
   determine, by the energy management controller, an operating plan for the devices in the energy management system based at least in part on the pricing signal; and
   generate, by the energy management controller, synthetic pricing signals to replace the pricing signal provided by the energy provider;
   intercept, at the energy management controller, a request from the devices to the energy provider requesting the energy provider to provide the pricing signal; and
   in response to the request, send the synthetic pricing signals, rather than the pricing signal received from the energy provider, from the energy management controller to the devices, wherein the synthetic pricing signals control the devices to operate according to the determined operating plan.

2. The apparatus of claim 1, wherein the synthetic pricing signal is provided from an optimization module based on a determined optimal operation.

3. The apparatus of claim 2, wherein the optimization module is accessible via a remote website to provide configurable optimization of the energy management system.

4. The apparatus of claim 1, wherein the energy management system is a system for optimization of a consumption entity, the consumption entity comprising:
   a residence;
   a group of residences;
   a business residence;
   a group of business residences; or
   any combination of the above.

5. The apparatus of claim 1, wherein the synthetic pricing signal is to operate as a direct control signal.

6. The apparatus of claim 1, wherein at least one of the devices comprises an application programming interface (API) to control operation of the device, wherein the logic, at least partially comprising hardware logic, overrides the API control via the synthetic pricing signal to control operation of the device.

7. A method for synthetic price provision, the method comprising:
   identifying, by an energy management controller, devices operating in a consumption entity, wherein the devices are configured to operate at least partially based on a pricing signal that indicates a price of energy provided by an energy provider;
   receiving, at the energy management controller, the pricing signal from the energy provider;
   determining, by the energy management controller, an operating plan for the devices based at least in part on the pricing signal;
   generating, by the energy management controller, synthetic pricing signals to replace the pricing signal provided by the energy provider;
   intercepting, at the energy management controller, a request from one of the devices for the pricing signal from the energy provider; and
   in response to the request, sending the synthetic pricing signals, rather than the pricing signal received from the energy provider, from the energy management controller to the devices, wherein the synthetic pricing signals control the devices to operate according to the determined operating plan.

8. The method of claim 7, wherein the synthetic pricing signal is provided from an optimization module based on the determined optimal operation.

9. The method of claim 8, wherein the optimization module is accessible via a remote website to provide configurable optimization of the energy management system.

10. The method of claim 7, wherein the consumption entity comprises:
    a residence;
    a group of residences;
    a business residence;
    a group of business residences; or
    any combination of the above.

11. The method of claim 7, wherein the synthetic pricing signal is to operate as a direct control signal.

12. The method of claim 7, wherein the identified device comprises an application programming interface (API) to control operation of the identified device, further comprising overriding the API control via the synthetic pricing signal to control operation of the identified device.

13. A system for synthetic price provision, the system comprising:
    a plurality of devices of a consumption entity; and
    an energy management controller, at least partially comprising hardware logic, to:
    identify the plurality of devices, wherein the plurality of devices is configured to operate at least partially based on a pricing signal that indicates a price of energy provided by an energy provider;
    receive the pricing signal from the energy provider;
    determine an operating plan for the devices in the system based at least in part on the pricing signal;
    generate synthetic pricing signals to replace the pricing signal provided by the energy provider;
    intercept requests from the plurality of devices to the energy provider requesting the energy provider to provide the pricing signal; and
    in response to the requests, send the synthetic pricing signals to the plurality of devices, rather than the pricing signal received from the energy provider, wherein the synthetic pricing signals control the plurality of devices to operate according to the determined operating plan.

14. The system of claim 13, wherein the synthetic pricing signal is provided from an optimization module based on the optimization model.

15. The system of claim 14, comprising a remote website to provide configurable optimization of the energy management system, wherein the optimization module is accessible via the remote website.

16. The system of claim 13, wherein the consumption entity comprises:
   a residence;
   a group of residences;
   a business residence;
   a group of business residences; or
   any combination of the above.

17. The system of claim 13, wherein at least one of the plurality of devices comprises an application programming interface (API) to control operation of the device, and wherein the synthetic pricing signal is provided to the identified device without access to the API.

18. A non-transitory tangible computer-readable medium comprising instructions to direct a processor to:
   identify devices operating in an energy management system, wherein the devices are configured to operate at least partially based on a pricing signal that indicates a price of energy provided by an energy provider;
   receive the pricing signal from the energy provider;
   determine an operating plan for the devices based at least in part on the pricing signal;
   generate synthetic pricing signals to replace the pricing signal provided by the energy provider;
   intercept a request from the devices to the energy provider requesting the energy provider to provide the pricing signal; and
   in response to the request, send the synthetic pricing signals to the devices, rather than the pricing signal received from the energy provider, wherein the synthetic pricing signals control the devices to operate according to the determined operating plan.

* * * * *